United States Patent [19]

Gilbert et al.

[11] Patent Number: 4,462,643

[45] Date of Patent: Jul. 31, 1984

[54] TAPERED ROLLER BEARING CAGE WITH SPIN RESISTING CHARACTERISTICS

[75] Inventors: George G. Gilbert, Farmington, Mich.; Richard O. Dimit, North Canton, Ohio

[73] Assignee: The Timken Company, Canton, Ohio

[21] Appl. No.: 302,502

[22] Filed: Sep. 16, 1981

[51] Int. Cl.³ .............................................. F16C 33/46
[52] U.S. Cl. .................................... 308/202; 308/218
[58] Field of Search ........... 308/202, 218, 217, 207 R, 308/201, 214

[56] References Cited

U.S. PATENT DOCUMENTS

| | | | |
|---|---|---|---|
| 2,105,013 | 1/1938 | Scribner | 308/217 |
| 2,205,372 | 6/1940 | Cornell | 308/218 |
| 3,477,773 | 11/1969 | Altson | 308/214 |
| 4,136,916 | 1/1979 | Musselman et al. | 308/213 |
| 4,317,601 | 3/1982 | Faigley | 308/202 |

Primary Examiner—Lenard A. Footland
Attorney, Agent, or Firm—Gravely, Lieder & Woodruff

[57] ABSTRACT

A polymer cage for a tapered roller bearing has the usual large and small end rings and bridges which connect the end rings to form pockets which receive the tapered rollers, so that the rollers are spaced properly and further will be held against the cone when the cone is removed from the cup. The cage, however, is constructed such that when it and the rollers are subjected to a jet of high velocity air, the cage and the roller set will not spin rapidly around the cone. This is achieved by detaching one of the bridges from one of the end rings so that the bridge and the rollers adjacent to the bridge will move outwardly during rotation or by providing at least one of the bridges with an outwardly directed rib. In either case, the balance of the cage is disrupted and its wind resistance is increased. As a result, the cage will not revolve at a high velocity when subjected to a jet of air.

9 Claims, 7 Drawing Figures

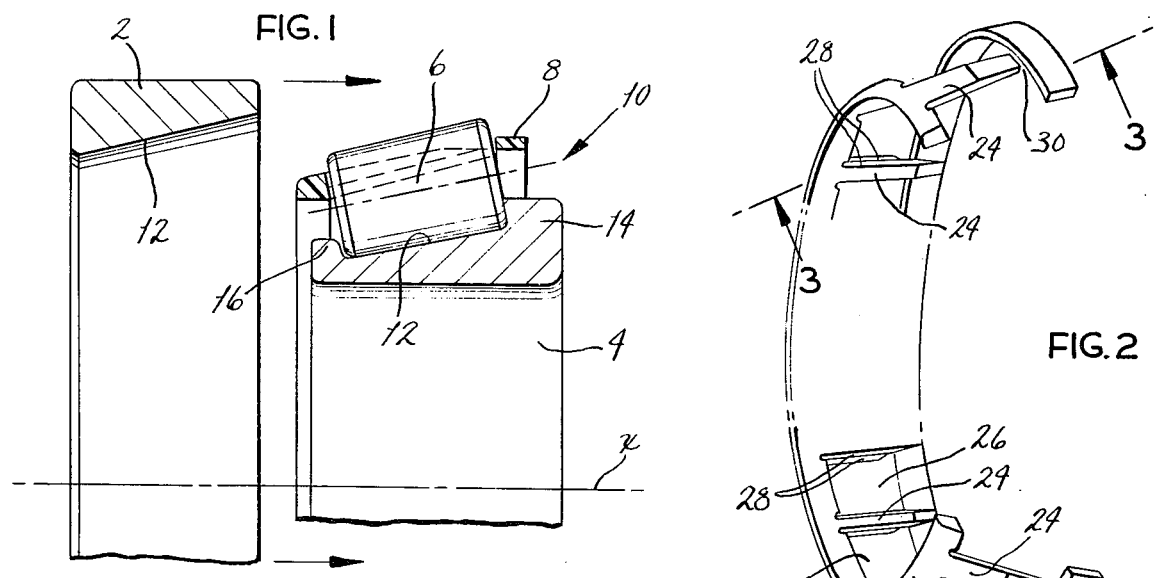
FIG. 1
FIG. 2
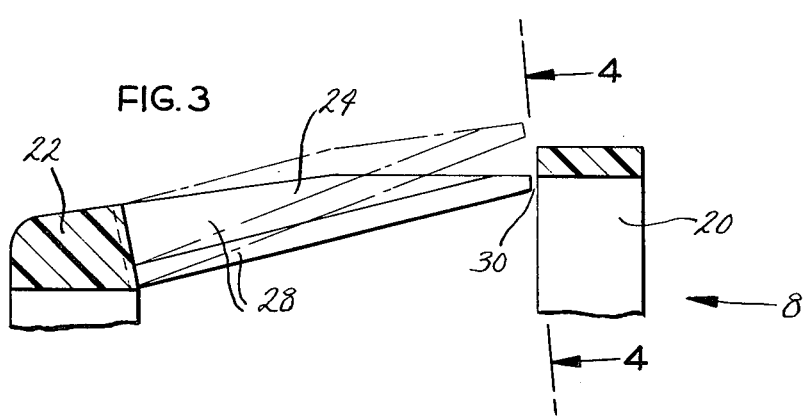
FIG. 3
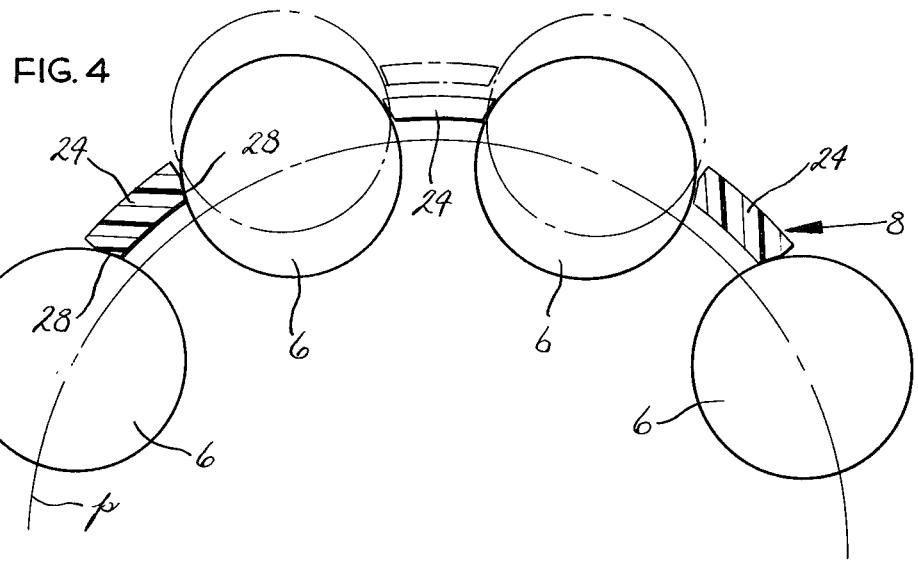
FIG. 4

TAPERED ROLLER BEARING CAGE WITH SPIN RESISTING CHARACTERISTICS

BACKGROUND OF THE INVENTION

This invention relates in general to antifriction bearings, and more particularly to bearings of that type having cages which will not spin at high speeds when subjected to high velocity jets of air.

Tapered roller bearings are used in a wide variety of machinery including automotive equipment. Irrespective of its purpose, the machinery at times must be disassembled, and when disassembly requires removal of the bearings, they are usually cleaned.

Typically, a tapered roller bearing is cleaned by immersing it in a solvent which removes both the lubricant, which is normally grease or oil, and dirt which may have contaminated the lubricant. In this regard, the typical tapered roller bearing of the type used in automotive equipment is usually supplied in two components, namely a cup or outer race and a cone assembly. The latter includes not only the cone or inner race, but also the complement of tapered rollers and a cage for holding the rollers around the cone when the cone is removed from the cup. During operation of the bearing the cage further serves to maintain the proper spacing between the rollers. The cup and the cone assembly are normally cleaned separately, that is, they are immersed in the solvent while separated from each other.

Once the cup and cone assembly are cleaned, they are then dried to remove the solvent and any particles of foreign matter that may be within it. Drying presents no problem insofar as the cup is concerned for all its surfaces are easily accessible and can be wiped dry with a rag or blown dry with a blast of air. The cone assembly however, is considerably more difficult to dry for the rollers and cage obscure critical surface areas on the cone. Blowing air into the cone assembly is often used as a means of drying it, but this method presents the possibility of setting the rollers and cage in motion so that they spin rapidly about the cone. In this regard, a jet of air issuing from the nozzle on the end of a high pressure hose will, if directed generally tangentially to the cage, propel the rollers and cage rapidly around the cone, sometimes at velocities exceeding 3,000 rev/min. This may seriously damage the bearing, particularly in view of the complete absence of lubrication in the bearing.

SUMMARY OF THE INVENTION

One of the principal objects of the present invention is to provide a bearing having a cage and rolling elements which cannot be spun rapidly about the inner race of the bearing when subjected to a jet of air. Another object is to provide a bearing of the type stated which operates as effectively as conventional bearings and can be disassembled and cleaned as easily as conventional bearings. A further object is to provide a bearing of the type stated having a cage which creates or has enough imbalance to prevent it from being rotated rapidly when subjected to a jet of high velocity air. An additional object is to provide a cage of the type stated which may be molded from a plastic resin. Still another object is to provide a cage of the type stated which is ideally suited for use in tapered roller bearings. These and other objects and advantages will become apparent hereinafter.

The present invention is embodied in a bearing having an inner race, rolling elements around the inner race, and a cage having means which extend outwardly from the main body of the cage as the cage revolves and prevents the cage from rotating at excessively high velocities around the inner race when a jet of air is directed at the cage and rolling elements. The invention also resides in the cage itself. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur FIG. 1 is an exploded sectional view of a tapered roller bearing provided with a spin-resistant cage constructed in accordance with and embodying the present invention;

FIG. 2 is a perspective view, partially broken away, of the cage;

FIG. 3 is a sectional view taken along line 3—3 of FIG. 2 and further showing in phantom lines the detached bridge in an outwardly deflected position;

FIG. 4 is a sectional view taken along line 4—4 of FIG. 3 and further showing in phantom lines the detached bridge and the rollers on each side of it in their outwardly deflected position;

DETAILED DESCRIPTION

Figure 5:
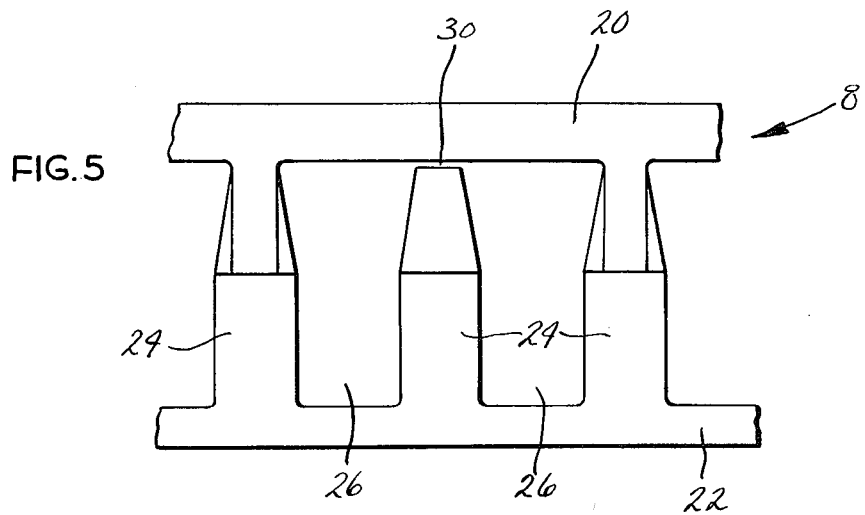
FIG. 5 is a partial plan view of the cage in the region of the detached bridge.

Referring now to the drawings, a single row tapered roller bearing A (FIG. 1) of the type commonly used in automotive equipment includes an outer race or cup 2, an inner race or cone 4 located within the cup 2, a complement of tapered rollers 6 arranged in a single row between the cup 2 and cone 4, and a cage 8 for maintaining the correct spacing between the rollers 6. The cage 8 further serves to hold the rollers 6 around the cone 4 when the cone 4 is withdrawn from its cup 2, and therefore in a sense unites the cone 4, the rollers 6, as well as itself into a unit known as a cone assembly 10. The rollers 6, of course, permit the cup 2 to rotate relative to the cone 4, or vice-versa, with little frictional resistance, all about an axis of rotation x.

The cup 2 and cone 4 (FIG. 1) are conventional, both having conical raceways 12 which, if extended to their respective apexes, would have those apexes located at a common point along the axis of rotation. While the raceway 12 for the cup 2 extends practically from one end of the cup 2 to the other end, the raceway 12 for the cone 4 terminates short of the end faces for the cone 4. Indeed, at the large diameter end of its raceway 12, the cone 4 is provided with a thrust rib 14, while at the small diameter end, it has a retaining rib 16. Both ribs 14 and 16 project radially outwardly beyond the cone raceway 12 and form an integral part of the cone 4.

The tapered rollers 6 fit between the thrust and retaining ribs 14 and 16 of the cone 4, and along their side faces contact the raceways 12 of both the cup 2 and cone 4. Moreover, when the bearing A is loaded, the large ends of the rollers 6 bear against the thrust rib 14 which prevents the rollers 6 from being expelled from the annular space between the cup 2 and cone 4. The smaller retaining rib 16, on the other hand, prevents the rollers 6 from sliding off of the cone raceway 12 when the cup 2 and cone 4 are separated. Thus, the ribs 14 and 16 cooperate with the cage 8 to hold the cone assembly 10 together.

The cage 8 (FIGS. 3-5) is preferably molded from a lightweight polymer resin having high strength, some flexibility, and the ability to withstand sustained bearing operating temperatures of at least 250° F. A suitable polymer resin is heat stabilized nylon 6/6 which is a common, commercially available, thermoplastic resin. Moreover, the cage 8 is molded as an integral unit, and is extracted from the mold as such.

The cage 8 basically includes (FIGS. 2 and 3) a large end ring 20, a small end ring 22, and bridges 24 that extend between the two end rings 20 and 22 at equally spaced intervals to provide the cage 8 with roller pockets 26. The size and configuration of the pockets 26 are such that they are capable of receiving the rollers 6 relatively loosely, yet confining them sufficiently to evenly space the rollers 6 around the cone 4. When the rollers 6 are so received, the large end ring 20 surrounds the thrust rib 14 and extends across the large end faces of the rollers 6. The small end ring 22, on the other hand, surrounds the retaining rib 16 and extends across the small end faces of the rollers 6. The bridges 24, which connect the two end rings 20 and 22, fit between the rollers 6 and serve to space the rollers 6 at equal intervals along the cup and cone raceways 12. The diameters of the two end rings 20 and 22 are such that the bridges 24 which extend between them generally follow the taper of the axial centerlines for the rollers 6 (FIG. 1). In this regard, the axial centerlines of the rollers 6, when the bearing A is set in operation, describe or generate an imaginary cone having its apex at the common apexes for the cup and cone raceways 12. Any circle along this cone is known as the pitch circle p (FIG. 4). Thus, the pitch circle p near the large end ring 20 has a larger diameter than a pitch circle p near the small end ring 22. The bridges 24 of the cage 8 lie, at least in part beyond the pitch circle p, where they are winged, that is provided with beveled surfaces 28 which from each side of every pocket 26 converge so that the pocket 26 is of a lesser width than the rollers 6. This prevents the rollers 6 from falling out of the pockets 26 when the cone assembly 10 is removed from the cup 4, thus enabling the cage 8 to retain the rollers 6 around the cone 4.

All of the bridges 24 are joined to and indeed molded integral with the small end ring 22. Along the large end ring 20 most of the bridges 24 are likewise joined to the end ring 20 by being molded integral with it. However, at least one of the bridges 24 is detached from the large end ring 20 at a cut 30 (FIGS. 3 and 5) which lies along the end of that bridge 24 to enable the bridge 24 to flex outwardly away from the pitch circle p. To this end, the cut 30 is positioned such that the large end ring 20 does not interfere with the outward movement of the free end of the detached bridge 24. The cut 30 may be formed in the molding operation, or the bridge 24 may be severed from the adjoining ring 20 with a cutting tool after the molding operation.

During the operation of the bearing A, the cage 8 functions as a normal cage, that is it maintains the proper spacing between the rollers 6 as they revolve between the raceways 12 of the cup 2 and cone 4. However, when the bearing A is disassembled to the extend that the cone assembly 10 is removed from the cup 2, the rollers 6 and cage 8 when subjected to a jet of high velocity air will not rotate at high speeds and perhaps damage the cone 4. On the contrary, the rollers 6 and cage 8 will rotate only relatively slowly, normally at a velocity of less than 2500 rev/min. In this regard, as the rollers 6 and cage 8 accelerate around the cone 4 under the force imparted by the air, the centrifual forces exerted on the detached bridge 24 as well as on the rollers 6 at each side of the detached bridge 24 urge that bridge 24 outwardly slightly (FIGS. 3 and 4, phantom lines). This tends to unbalance the set of rollers 6 and the cage 8 which in turn causes them to become unstable and vibrate or flutter slightly. The imbalance and the vibration and flutter which accompany it prevent the set of rollers 6 and cage 8 from reaching excessively high velocities. In addition, the outwardly directed end of the detached bridge 24 and the outwardly directed large ends of the rollers 6 on each side of that bridge 24 increase the wind resistance of the revolving rollers 6 and cage 8. This additional wind resistance assists in preventing the rollers 6 and cage 8 from reaching high velocities. In this regard, the outwardly projecting detached rib 24 and the rollers 6 on each side of its dissipate more energy through the turbulence they produce than they pick up from the air jet, because the air jet is effective on those components for only a small arc in each revolution. Finally, the outwardly directed end of the detached bridge 24 slightly enlarges the roller pockets 26 on each side of it, at least at the large ends of those pockets. Thus, the rollers 6 fit somewhat more loosely in the large ends of those pockets 26, and as the jet of air impinges on them they tend to skew, so that those rollers 6 are driven to rub against the retaining rib 16 and the thrust rib 14. This further maintains the speed of the set of rollers 6 and cage 8 within acceptable limits. When the air jet is taken away, the rollers 6 and cage 8 coast to a stop, and the detached bridge 24 as well as the rollers 6 on each side of it return to their original positions.

The detached bridge 24 need not be severed adjacent to the large end ring 20 of the cage 8, but instead may be severed adjacent to the small end ring 22. Moreover, more than one bridge 24 may be severed at a cut 30. If two or more detached bridges 24 are used, it is preferred that they be located in an asymmetrical manner about the cage 8. Also it is possible that the cut 30 need not be completely through the bridge 24, but instead the cage 8 could be constructed with thin web of polymer across the cut 30 so as to connect the bridge 24 to the end ring 20. The web, however, would be thin enough to break under centrifugal force creased by the rollers 6 as they revolve about the cone 4 in the absence of the cup 2.

The cage 8 may be the same as the polymer cage disclosed in U.S. patent application Ser. No. 135,693 of Charles W. Faigley, Jr., filed Mar. 31, 1980, now U.S. Pat. 4,317,601, with the exception, of course, of the cut 30 and the detached bridge 24 that it creates.

Figure 6:
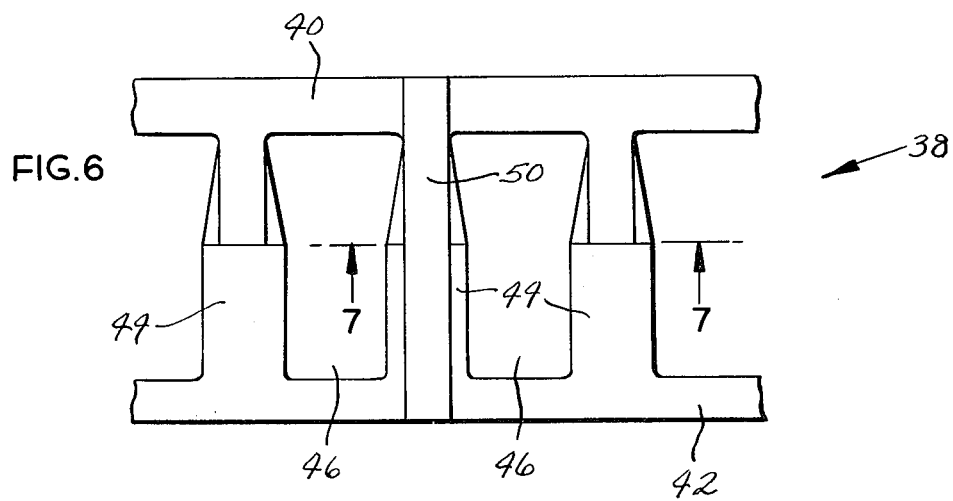
FIG. 6 is a partial plan view of a modified cage in the region of the rib thereon.
Figure 7:
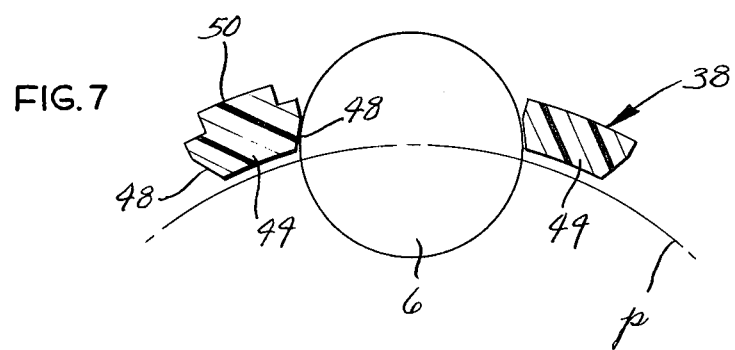
FIG. 7 is a sectional view taken along line 7—7 of FIG. 6.

A modified cage 38 (FIGS. 6 and 7) serves the same purpose as the cage 8 and indeed is quite similar in construction to the cage 8. In this regard, the cage 38 is preferably molded from a polymer and includes a large end ring 40 that lies beyond the large ends of the rollers 6, a small end ring 42 that lies beyond the small ends of the rollers 6, and bridges 44 that connect the two end rings 40 and 42 to form pockets 46 in which the rollers 6 are received. At least a portion of each bridge 44 is located beyond the pitch circle p (FIG. 7), and these portions of the bridges 44 are winged, that is provided with beveled surfaces 48 to keep the rollers 6 within the pockets 46. In contrast to the cage 8, all of the bridges 44 for the cage 38 are joined firmly to the end rings 40 and 42 between which they extend.

At least one of the bridges 44 is provided with a rib 50 which extends substantially the entire length of the bridge 44 and into the end rings 40 and 42 as well, so that the rib 50 extends essentially the full width of the cage 38. The rib 50 projects radially beyond the outwardly presented surfaces of the rings 40 and 42 and the remaining bridges 44 as well, but even so the outward projection of the rib 50 is not so great as to extend beyond the outwardly presented surfaces of the rollers 6. Thus, the rib 50 does not interfere with the raceway 12 of the cup 2 during the operation of the bearing A.

The cage 38 functions as a conventional cage during the operation of the bearing A. On the other hand, when the bearing A is disassembled to expose its cage 38, the rollers 6 and cage 38 cannot be spun rapidly with a high velocity air jet. The rib 46 prevents this, for it disrupts the balance of the cage 8 which in turn causes enough vibration and flutter to prevent the set of rollers 6 and cage 8 from revolving at excessively high velocities. Also, the jet of air acting on the rib 50 probably distorts the resilient cage 38 temporarily into an oval shape which generates flutter and increases friction. In addition, the rib 46 disrupts the air flow around the revolving rollers 6 and cage 38 and in effect increases the air resistance of the spinning cage 38.

Of course, the cage 38 may have more than one of its bridges 44 equipped with ribs 50, but they should not be located symmetrically on the cage 38.

Also, another modified cage may have some of its bridges detached as in the cage 8 and others of its bridges provided with ribs as in the cage 38. Similarly, a rib much like the rib 50 may be incorporated into a detached bridge.

Still another alternative is to have one or more ribs extended inwardly from the bridges of the cage with these ribs being located in an asymmetrical manner so as to create imbalance as the cage revolves. Indeed, the same effect may be achieved by placing bosses or tabs along the end rings in an asymmetrical manner to provide weighted areas which create imbalance.

From the foregoing it can be seen that the detached bridge 24 on the cage 8 and the rib 40 on the cage 38 constitute restraining means for preventing the cages 8 and 38 and the set of rollers 6 that they confine from rotating at excessively high velocities when subjected to a jet of air.

This invention is intended to cover all changes and modifications of the example of the invention herein chosen for purposes of the disclosure which do not constitute departures from the spirit and scope of the invention.

What is claimed is:

1. A cage for a roller bearing that has an inner race provided with a raceway and rollers arranged in a row around the raceway, said cage being formed from a flexible polymer and comprising: a first end ring, a second end ring, and bridges extending between the end rings to form pockets that are large enough to receive the outwardly presented portions of the rollers, yet are small enough to prevent the rollers from falling through the pockets, whereby the cage will hold the rollers about the inner race when the inner race is removed from an outer race, and means located asymmetrically on the cage for creating within the cage and rollers confined by the cage an imbalance of sufficient magnitude to prevent the cage and rollers from rotating at excessively high speeds around the inner race when the cage and the rollers are subjected to a jet of high velocity air that is directed generally tangentially at the cage in the absence of an outer race.

2. A cage according to claim 1 wherein the means comprises a cut at the end of one of the bridges so that the bridge is substantially detached from the adjoining end ring, the bridge being flexible enough to extend outwardly beyond the main body of the cage and disrupt the balance of the cage and the set of rollers that it confines.

3. The combination according to claim 2 wherein the detached bridge, when the cage and rolling elements are set in motion, will flex enough to permit the rollers on each side of it to skew slightly with respect to the raceway of the inner race and thereby impede rotation of the cage and rollers.

4. A cage according to claim 2 wherein the one end ring is larger than the other end ring and the pockets are configured to accommodate tapered rollers; and wherein the cut in the one bridge is adjacent to the large end ring.

5. The combination according to claim 1 wherein the means for creating an imbalance within the cage and rollers comprises a rib that projects outwardly from at least one of the cage bridges.

6. The combination according to claim 5 wherein the rib extends the full length of the bridge.

7. The combination according to claim 6 wherein the rib extends axially into the end rings as well.

8. In an antifriction bearing assembly having an inner race provided with a raceway and rolling elements arranged in a row around the raceway, an improved cage configured to receive the rolling elements and thereby maintain the proper spacing between the rolling elements and to further hold the rolling elements around the inner race when the inner race is removed from an outer race, the cage being formed from a flexible synthetic resin and including spaced apart end rings and bridges that extend between the end rings to form pockets in which the rolling elements are received, a portion of the bridges being joined to both of the end rings and a portion of the bridges asymmetrically located on the cage being detached from one of the end rings such that when the cage rotates outside of the outer race, said bridges and the rolling elements confined thereby will deflect outwardly away from the inner race to create within the cage and the row of rolling elements an imbalance of sufficient magnitude to prevent the cage from rotating along with the rolli g elements at excessively high velocities around the inner race when a high velocity jet of air is directed generally tangentially at the cage.

9. In an antifriction bearing assembly having an inner race provided with a raceway and rolling elements arranged in a row around the raceway, an improved cage configured to in part receive the rolling elements and thereby maintain the proper spacing between the rolling elements and to further hold the rolling elements around the inner race when the inner race is removed from an outer race, the cage having restraining means arranged asymmetrically on the cage so that the cage does not possess radial symmetry, said restraining means extending outwardly from the usual body of the cage when the cage rotates creating within the row of rolling elements an imbalance of sufficient magnitude to prevent the cage from rotating along with the rolling elements at excessively high velocities around the inner race when a high velocity jet of air is directed generally tangentially at the cage

* * * * *